(12) United States Patent
Lim

(10) Patent No.: US 9,903,983 B2
(45) Date of Patent: Feb. 27, 2018

(54) CURVED DISPLAY DEVICE HAVING RESISTANCE TO EXCESSIVE BENDING

(71) Applicant: SAMSUNG DISPLAY CO., LTD., Yongin-si, Gyeonggi-do (KR)

(72) Inventor: Tae Woo Lim, Yongin-si (KR)

(73) Assignee: Samsung Display Co., Ltd. (KR)

( * ) Notice: Subject to any disclaimer, the term of this patent is extended or adjusted under 35 U.S.C. 154(b) by 159 days.

(21) Appl. No.: 14/952,742

(22) Filed: Nov. 25, 2015

(65) Prior Publication Data

US 2016/0146979 A1    May 26, 2016

(30) Foreign Application Priority Data

Nov. 26, 2014 (KR) .................. 10-2014-0166439

(51) Int. Cl.
*G02F 1/1333* (2006.01)
*G02B 1/14* (2015.01)
*H04B 1/3888* (2015.01)

(52) U.S. Cl.
CPC .......... *G02B 1/14* (2015.01); *G02F 1/133305* (2013.01); *H04B 1/3888* (2013.01)

(58) Field of Classification Search
CPC ................................ G02F 1/133305
See application file for complete search history.

(56) References Cited

U.S. PATENT DOCUMENTS

2012/0062447 A1* 3/2012 Tseng ............... G02F 1/133305 345/33
2012/0062448 A1* 3/2012 Kim .................. G02F 1/133377 345/55

FOREIGN PATENT DOCUMENTS

| KR | 10-1097430 B1 | 12/2011 |
| KR | 10-1273182 B1 | 6/2013 |
| KR | 10-2014-0136762 A | 12/2014 |

* cited by examiner

*Primary Examiner* — Wen-Ying P Chen
(74) *Attorney, Agent, or Firm* — Innovation Counsel LLP

(57) ABSTRACT

Embodiments of the present invention provide a curved display device including: a display panel; and a protection pattern coupled to the display panel, wherein the protection pattern includes a plurality of first patterns and second patterns connecting adjacent first patterns, and the second patterns have arcuate shapes when the display panel is flat. According to embodiments of the present invention, the panel is prevented from being bent beyond a threshold curvature by the protection pattern, thereby preventing damage to the panel.

19 Claims, 8 Drawing Sheets

CURVED DISPLAY DEVICE HAVING RESISTANCE TO EXCESSIVE BENDING

CROSS-REFERENCE TO RELATED APPLICATION

This application claims priority to, and the benefit of, Korean Patent Application No. 10-2014-0166439 filed in the Korean Intellectual Property Office on Nov. 26, 2014, the entire contents of which are incorporated herein by reference.

BACKGROUND (a) Field

Embodiments of the present invention relate generally to flat panel displays. More specifically, embodiments of the present invention relate to curved display devices with resistance to excessive bending.

(b) Description of the Related Art

Common display devices include liquid crystal displays (LCDs) and organic light emitting displays (OLEDs).

The LCD displays images by applying voltages to field-generating electrodes to generate an electric field in the LC layer. This electric field determines the orientations of LC molecules of the LC layer, to adjust polarization of incident light. Differently from the liquid crystal display, the OLED has a self-luminous characteristic, does not require a separate light source, and displays an image through a display substrate in which a thin film transistor and an organic light emitting element are formed.

Recent efforts have focused on increasing the screen size of both LCDs and OLEDs. However, when the size of these display devices is enlarged, the center portion of the screen begins to appear different from the left and right ends of the screen.

To compensate for such difference in the visual field, it is possible to form a display device in a curved shape by bending the display device to have a concave shape or a convex shape. The display device may be provided as a portrait type format having a longer vertical length than a horizontal length and bent in a vertical direction, or may be provided as a landscape type format having a shorter vertical length than a horizontal length and bent in a horizontal direction.

However, when a display device is bent, a compressive stress is applied to one side of the curved surface and a tensile stress is applied to the other side of the substrate. In the case of bending the display device to more than a predetermined curvature, cracks may be generated in the substrate and damage to the panel may result.

The above information disclosed in this Background section is only for enhancement of understanding of the background of the invention and therefore it may contain information that does not form the prior art that is already known in this country to a person of ordinary skill in the art.

SUMMARY

Embodiments of the present invention provide a curved display device with a protection pattern that prevents the panel from being damaged by bending beyond a threshold curvature.

An exemplary embodiment of the present invention provides a curved display device including: a display panel; and a protection pattern coupled to the display panel, wherein the protection pattern includes a plurality of first patterns and second patterns connecting adjacent first patterns, and the second patterns have arcuate shapes when the display panel is flat.

Each first pattern may have a shape comprising a circle, a quadrangle, or a rhombus.

Each second pattern may have a shape that includes multiple arc shapes extending between adjacent first patterns.

The arc shapes of each second pattern may be connected to each other.

The first patterns may adhere to the display panel, and the second patterns may not adhere to the display panel.

When the display panel is bent toward a first direction, the second patterns may be arranged to bend so that parts thereof orient toward a second direction substantially perpendicular to the first direction, and when the display panel is bent toward a direction opposite to the first direction, the second patterns may be arranged to straighten so as to extend substantially linearly between adjacent first patterns.

Another exemplary embodiment of the present invention provides a curved display device including: a display panel including a substrate; and a protection pattern patterned on the substrate, wherein the protection pattern includes a plurality of first patterns and second patterns connecting adjacent first patterns, the first patterns have shapes comprising a circle, a quadrangle, or a rhombus, and the second patterns have arcuate shapes extending between adjacent first patterns.

Each second pattern may have a shape that includes multiple arc shapes extending between adjacent first patterns.

Another exemplary embodiment of the present invention provides a curved display device including: a protection pattern; a first polarizer formed on the protection pattern; a substrate formed on the first polarizer; a pixel electrode formed on the substrate; a liquid crystal layer positioned within a microcavity formed on the pixel electrode; a roof layer supporting the microcavity; and a first polarizer formed on the roof layer. The protection pattern includes a plurality of first patterns and second patterns connecting adjacent first patterns, the first patterns have shapes comprising a circle, a quadrangle, or a rhombus, and the second patterns have arcuate shapes extending between adjacent first patterns.

A further exemplary embodiment of the present invention provides a curved display device including: a first polarizer; a substrate formed on the first polarizer and including a protection pattern formed thereunder; a pixel electrode formed on the substrate; a liquid crystal layer positioned within a microcavity formed on the pixel electrode; a roof layer supporting the roof layer; and a first polarizer formed on the roof layer. The protection pattern includes a plurality of first patterns and second patterns connecting adjacent first patterns, the first patterns have shapes comprising a circle, a quadrangle, or a rhombus. Also, the second patterns have arcuate shapes extending between adjacent first patterns.

As described above, embodiments of the present invention prevent the panel from being bent beyond a threshold curvature through use of a protection pattern, thereby preventing damage to the panel.

DETAILED DESCRIPTION OF THE EMBODIMENTS

Figure 1:
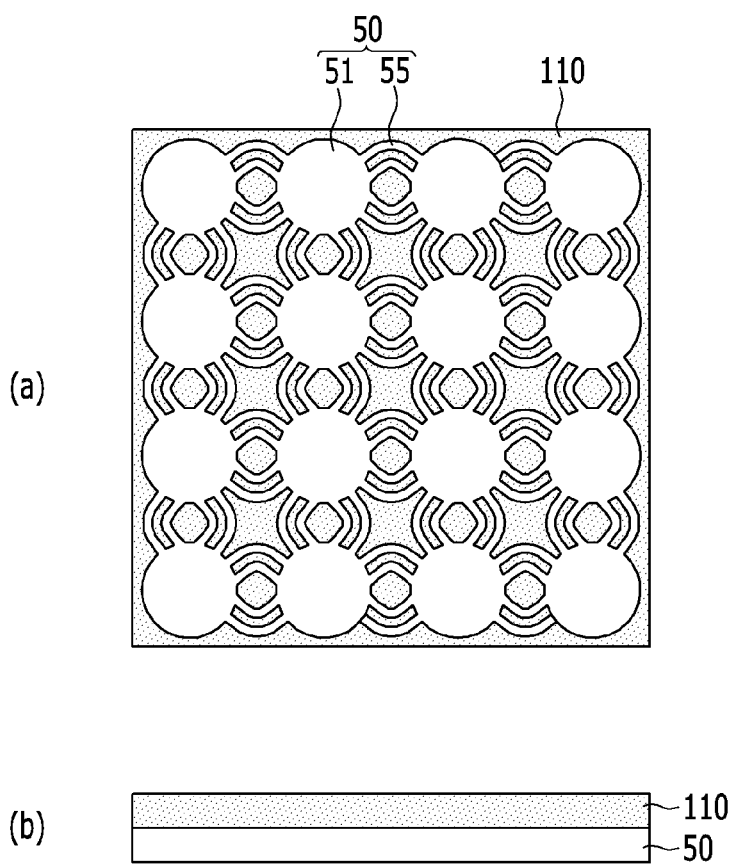
FIG. 1 is a plan view (a) and a side view (b) of a protection pattern according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. The Figures are thus not to scale. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present. All numerical values are approximate, and may vary. All examples of specific materials and compositions are to be taken as nonlimiting and exemplary only. Other suitable materials and compositions may be used instead.

A protection pattern that may be applied to a curved display device according to an exemplary embodiment of the present invention is described with reference to FIG. 1.

FIG. 1 shows a plan view (a) and a side view (b) of a protection pattern according to an exemplary embodiment of the present invention.

The protection pattern 50 is attached or otherwise coupled to a lower surface of a substrate 110 of a display panel, and includes a first pattern 51 and a second pattern 55. More specifically, a plurality of first patterns 51 formed in the protection pattern 50 may be connected to each other by a plurality of second patterns 55.

Here, the upper surface of the substrate 110 refers to the surface facing the display direction of the screen in the display panel, and the lower surface of the substrate 110 refers to the surface facing the direction opposite to the display direction.

The first patterns 51 of the protection pattern 50 according to an exemplary embodiment of the present invention may be formed in a circular shape, and the second patterns 55 may be formed as arc shaped lines that form curves extending between adjacent first patterns 51.

That is, the plurality of first patterns 51 are separated from each other by a predetermined distance and may be formed over the entire surface of the substrate 110, and the second patterns 55 are formed to connect adjacent first patterns 51.

The second patterns 55 may be formed as a plurality of lines extending between adjacent first patterns 51.

For convenience, in FIG. 1, each second pattern 55 is comprised of four lines each forming an arc shape extending between neighboring first patterns 51. However, embodiments of the invention are not limited thereto, and the second patterns 55 may be formed of any number of curved lines.

The protection pattern 50 may be made of a material having a predetermined degree of flexibility as well as predetermined strength, such as a plastic, and particularly, when it is applied to the liquid crystal display, a transparent material may be used such that light emitted from a backlight unit may be transmitted therethrough.

The first patterns 51 are attached to the lower surface of the substrate 110, however the second patterns 55 may or may not be attached to the lower surface of the substrate 110, and the first patterns 51 and the second patterns 55 may be formed in various sizes or lengths as desired.

Figure 2:
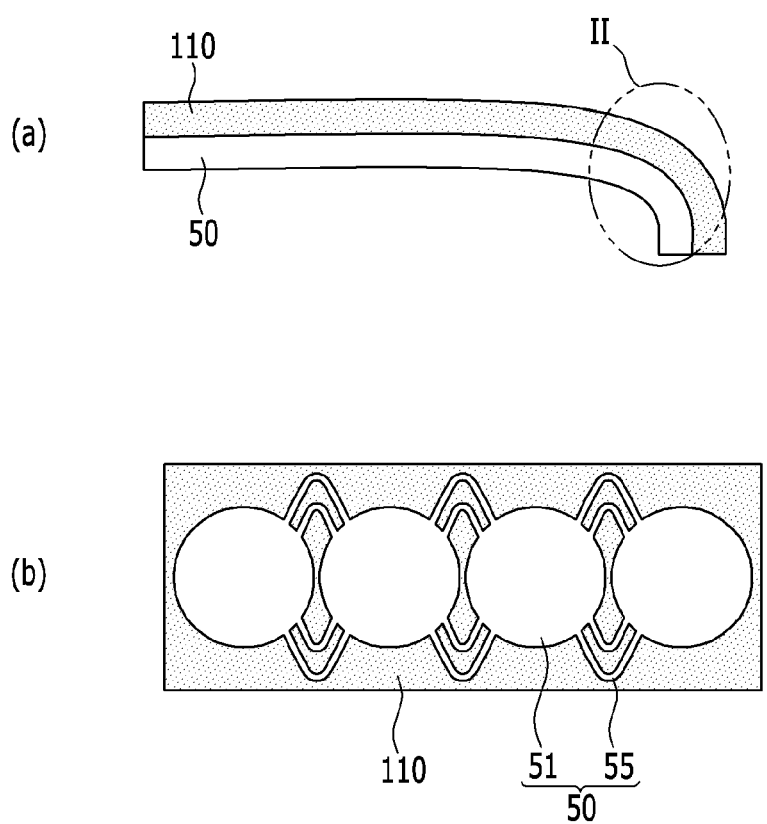
FIG. 2 is a view showing a protection pattern according to an exemplary embodiment of the present invention, where the protection pattern is bent in a first direction.
Figure 3:
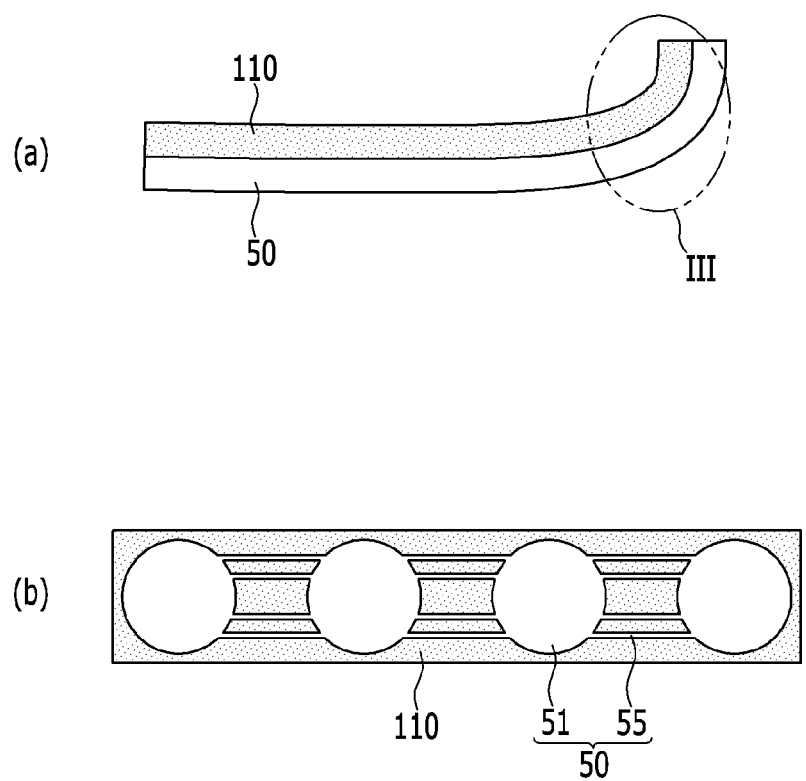
FIG. 3 is a view showing a protection pattern according to an exemplary embodiment of the present invention, where the protection pattern is bent in a second direction.

FIG. 2 is a view showing the bending of a protection pattern in a first direction, and FIG. 3 is a view showing the bending of a protection pattern in a second direction.

First, referring to FIG. 2, the protection pattern 50 and substrate 110 are bent in the direction toward which the lower surface of the substrate 110 faces (hereinafter referred to as a first direction).

FIG. 2 (*a*) is a side view of the substrate 110 and protection pattern 50 after bending toward the first direction, and FIG. 2 (*b*) is a plan view of area II of the protection pattern 50 as bent toward the first direction.

When bending the substrate 110 toward the first direction, a tensile stress is generated in an upper region of the substrate 110, and a compressive stress is generated in a lower region of the substrate 110.

When bending the substrate 110 to more than a predetermined curvature, the display device may be damaged by the resulting internal stresses, and the maximum degree of curvature before the substrate 110 is damaged may be referred to as a threshold curvature.

Accordingly, when forming the curved surface in the curved display device, it is desirable to avoid bending the substrate to a degree greater than the threshold curvature, as this may have a significant impact on life of the curved display device.

The protection pattern 50 may be applied to the substrate 110 to prevent the substrate 110 from being bent beyond its threshold curvature in the first direction. More specifically as the substrate 110 is bent in the first direction, the second pattern 55 is also bent so that its first patterns 51 are compressed toward each other, or squeezed together. The patterns 51 eventually contact each other, preventing further bending. Accordingly, the patterns 51 may prevent bending beyond the threshold curvature. That is, the substrate 110 may not be bent more than the threshold curvature in the first direction, due to the presence of the first patterns 51.

Thus, when the substrate 110 is bent in the first direction, the first patterns 51 prevent the substrate 110 from being bent beyond the threshold curvature. Furthermore, the second patterns 55 also provide further resistance to bending, as will be explained below.

Next, the protection pattern 50 will be described for the case that the substrate 110 is bent in the direction of the upper surface (hereinafter referred to as a second direction) with reference to FIG. 3.

FIG. 3 (*a*) is a side view showing the substrate 110 and protection pattern 50 bent in the second direction, and FIG. 3 (*b*) is a plan view showing further details of the protection pattern 50 in portion III of FIG. 3 (*a*).

When bending the substrate 110 in the second direction, tensile stress is generated in the lower surface in the substrate 110 and compressive stress is generated in the upper surface of the substrate 110. When bending the substrate 110 in the second direction to a degree greater than its threshold curvature, the display device may be damaged by these tensile and compressive stresses.

For the case that the protection pattern 50 according to an exemplary embodiment of the present invention is applied under the substrate 110 of the display panel, when bending the substrate 110 in the second direction, the substrate 110 may be prevented from bending beyond the threshold curvature by the second patterns 55.

That is, the second patterns 55 that were originally formed as curved line are gradually unfolded to become straight lines extending along the direction that the substrate 110 is bent. As the second patterns 55 cannot be further elongated beyond this point, the substrate 110 may be prevented from bending any further. That is, the substrate 110 may be prevented from bending beyond the threshold curvature by the second patterns 55.

In short, in the case that the substrate 110 is bent in the second direction, the second patterns 55 prevent the substrate 110 from being bent beyond the threshold curvature.

As shown in FIG. 2 and FIG. 3, in some embodiments, the first patterns 51 are affixed to the lower surface of the substrate 110, but the second patterns 55 are not.

Also, the first patterns 51 and the second patterns 55 of the protection pattern 50 may have various sizes and lengths according to the threshold curvature of the substrate 110, as will be observed by one of ordinary skill in the art.

Figure 4:
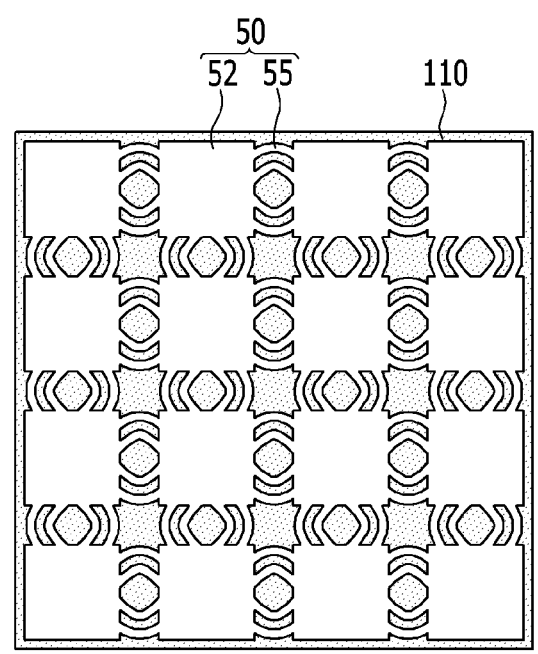
FIG. 4 is a view showing a protection pattern according to another exemplary embodiment of the present invention.
Figure 5:
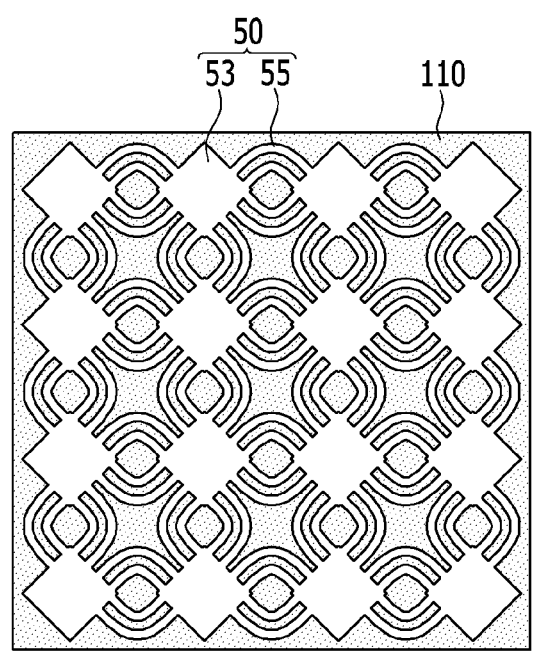
FIG. 5 is a view showing a protection pattern according to another exemplary embodiment of the present invention.
Figure 6:
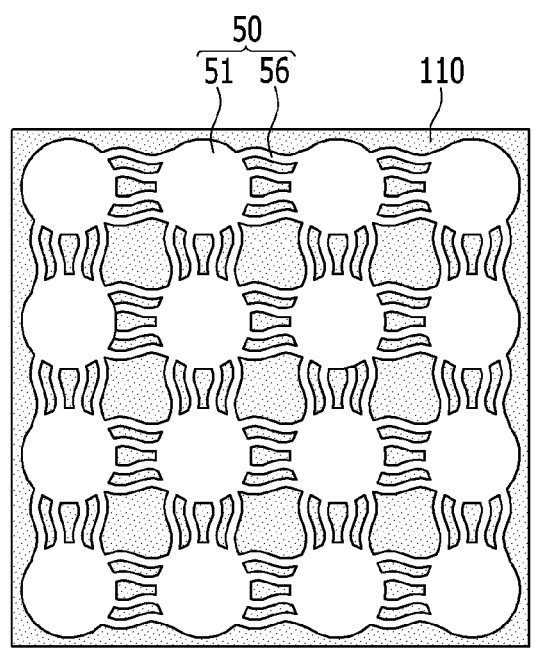
FIG. 6 is a view showing a protection pattern according to another exemplary embodiment of the present invention.

Next, the protection pattern according to another exemplary embodiment of the present invention will be described with reference to FIG. 4 to FIG. 6. FIG. 4 to FIG. 6 are views of a protection pattern according to an exemplary variation of the present invention.

The protection pattern according to another exemplary embodiment of the present invention shown in FIG. 4 is substantially the same as the exemplary embodiment of the present invention shown in FIG. 1 except for the shape of the first pattern, and as such any redundant description may be omitted.

As shown in FIG. 4, the first patterns 52 of the protection pattern 50 according to the current exemplary embodiment of the present invention each have a generally square shape. The second patterns 55 connect the plurality of first patterns 52 to each other and have curved arc shapes in-between the first patterns 52.

The protection pattern according to another exemplary embodiment of the present invention shown in FIG. 5 is also substantially the same as the exemplary embodiment of the present invention shown in FIG. 1 except for the shape of the first pattern, such that repeated description may be omitted.

As shown in FIG. 5, the first patterns 53 of the protection pattern 50 according to the current exemplary embodiment of the present invention each have a general rhombus shape. The second patterns 55 connect the plurality of first patterns 53 to each other and have curved arc shapes in-between the first patterns 53.

The protection pattern according to another exemplary embodiment of the present invention shown in FIG. 6 is substantially the same as the exemplary embodiment of the present invention shown in FIG. 1 except for the shape of the second pattern, such that repeated description may be omitted.

As shown in FIG. 6, the second patterns 56 of the protection pattern 50 according to the current exemplary embodiment of the present invention may be formed as wavy or arcuate shapes that have two curved portions between neighboring first patterns 51. That is, each second pattern 56 is formed in the shape of two connected arc shapes that together form a wavelike shape.

The wavelike second patterns 56 allow the substrate 110 to be bent further in the second direction than the arc shapes of the second patterns 55 of FIG. 1.

Figure 7:
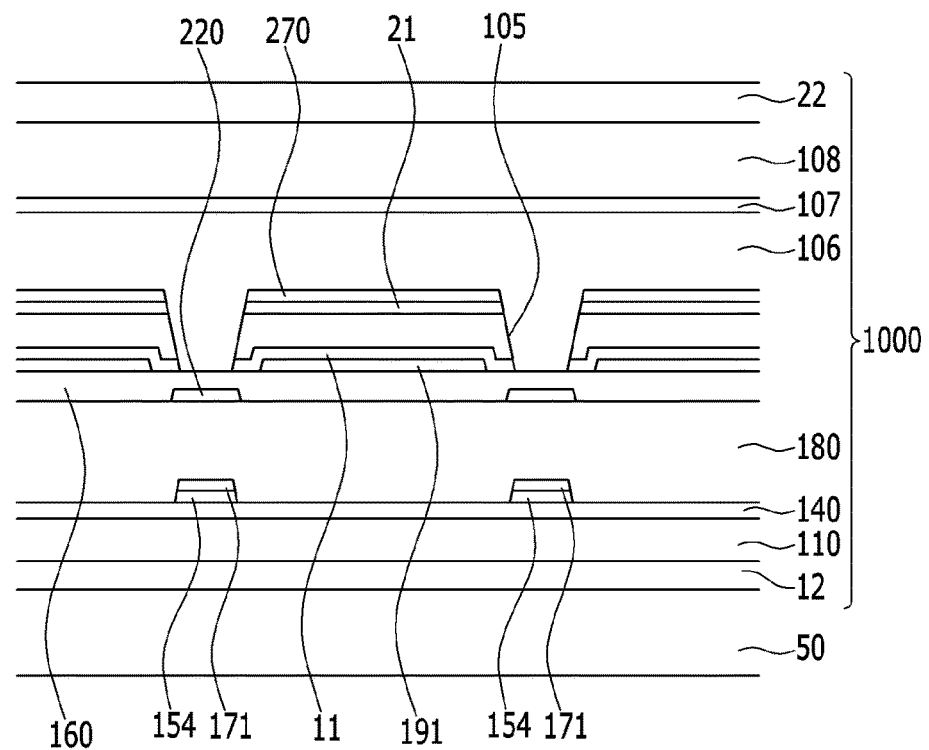
FIG. 7 is a cross-sectional view of a curved display device with a protection pattern according to the exemplary embodiment of FIG. 1.

Next, a curved display device with a protection pattern according to an exemplary embodiment of the present invention will be described with reference to FIG. 7. FIG. 7 is a cross-sectional view of a curved display device with a protection pattern according to the exemplary embodiment of FIG. 1.

Referring to FIG. 7, a curved display device according to an exemplary embodiment of the present invention includes a liquid crystal panel 1000 disposed under the protection pattern 50 of FIG. 1.

The protection pattern 50 is the same as described above, such that repeated description is omitted.

The liquid crystal panel 1000 includes a first polarizer 12, a substrate 110 disposed on the first polarizer 12, a plurality of gate lines (not shown), a gate insulating layer 140, a plurality of semiconductors 154, a plurality of data lines 171, and a passivation layer 180.

A plurality of light blocking members 220 and an interlayer insulating layer 160 are disposed on the passivation layer 180. A light blocking member 220 overlaps or covers each data line 171. The interlayer insulating layer 160 covers the light blocking members 220 and an upper surface thereof is substantially flat.

A pixel electrode 191 is disposed on the interlayer insulating layer 160, a first alignment layer 11 is disposed on the pixel electrode 191, a second alignment layer 21 is disposed facing the first alignment layer 11, and a microcavity 105 is disposed between the first alignment layer 11 and the second alignment layer 21.

A liquid crystal material including liquid crystal molecules is injected in the microcavity 105, and the microcavity 105 has a liquid crystal injection hole (not shown) through which the liquid crystal material is injected. The liquid crystal injection hole (not shown) may be positioned at a side of the microcavity 105.

A common electrode 270 is disposed on the second alignment layer 21. The common electrode 270 receives a common voltage and generates an electric field along with the pixel electrode 191 which receives a data voltage, thereby determining a direction of the liquid crystal molecules positioned in the corresponding microcavity 105. The common electrode 270 forms a capacitor along with the pixel electrode 191 to maintain the applied voltage after the corresponding thin film transistor is turned off.

In the present exemplary embodiment, the common electrode 270 is formed on the microcavity 105, however as another exemplary embodiment, the common electrode 270 is formed under the microcavity 105 thereby driving the liquid crystal according to a coplanar electrode (CE) mode.

A roof layer 106 is disposed on the common electrode 270. The roof layer 106 supports the microcavities 105 so as to keep them from collapsing or being crushed. The roof layer 106 may include a photoresist, or other organic materials.

An insulating layer 107 made of a silicon nitride (SiNx) or a silicon oxide (SiOx) is disposed on the roof layer 106, and a capping layer 108 is disposed on the insulating layer 107.

The capping layer 108 covers and fills the exposed liquid crystal injection hole of each microcavity 105. The capping layer 108 includes an organic material or an inorganic material.

A second polarizer 22 is disposed on the capping layer 108.

Figure 8:
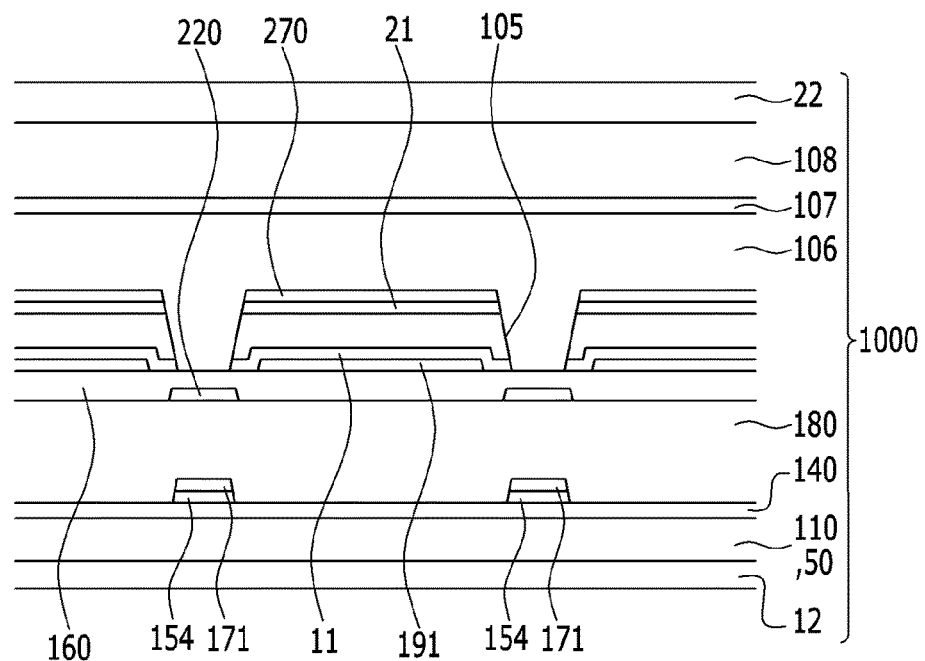
FIG. 8 is a cross-sectional view of a curved display device with a protection pattern according to another exemplary embodiment of the present invention.

The curved display device according to another exemplary embodiment of the present invention will now be described with reference to FIG. 8. FIG. 8 is a cross-sectional view of the curved display device having an attached protection pattern and being constructed according to another exemplary embodiment.

The curved display device according to the current exemplary embodiment of the present invention shown in FIG. 8 is substantially the same as an exemplary embodiment of the present invention shown in FIG. 7 except for the position of the protection pattern.

As shown in FIG. 8, in the curved display device according to the current exemplary embodiment of the present invention, the protection pattern 50 is formed to be patterned on the first substrate 110 itself.

In the curved display device according to the exemplary embodiment of FIG. 7, the separate protection pattern 50 is adhered to the liquid crystal panel 1000, however in the case of the curved display device according to the exemplary embodiment of FIG. 8, the protection pattern 50 is directly patterned in the lower surface of the first substrate 110 included in the liquid crystal panel 1000.

The thickness of the protection pattern 50 may vary according to the thickness of the substrate 110, and is preferably 80%-90% of the thickness of the substrate 110 to maintain sufficient flexibility, however embodiments are not limited thereto and any thickness is contemplated.

In this case, the protection pattern 50 is formed in the substrate 110 such that the first polarizer 12 may be positioned under the protection pattern 50. Also, the protection pattern 50 may be patterned directly on the substrate 110.

As described above, the curved display device according to an exemplary embodiment of the present invention prevents the panel from being bent beyond its threshold curvature, by use of a protection pattern, thereby preventing damage to the panel.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Furthermore, different features of the various embodiments, disclosed or otherwise understood, can be mixed and matched in any manner to produce further embodiments within the scope of the invention.

DESCRIPTION OF SYMBOLS

| 50: protection pattern | 51, 52: first, second pattern |
| 110: substrate | 140: gate insulating layer |
| 154: semiconductor | 171: data line |
| 180: passivation layer | 220: light blocking member |
| 160: interlayer insulating layer | 191: pixel electrode |
| 11, 21: first, second alignment layer | 270: common electrode |

-continued

| 105: microcavity | 106: roof layer |
| 107: insulating layer | 108: capping layer |
| 12, 22: first, second polarizer | |

What is claimed is:

1. A curved display device, comprising: a display panel; and a protection pattern coupled to the display panel, wherein the protection pattern includes a plurality of first patterns and second patterns connecting adjacent first patterns, the second patterns have arcuate shapes when the display panel is flat, and each first pattern has a shape comprising a circle, a quadrangle, or a rhombus.

2. The curved display device of claim 1, wherein each second pattern has a shape that includes multiple arc shapes extending between adjacent first patterns.

3. The curved display device of claim 2, wherein the arc shapes of each second pattern are connected to each other.

4. The curved display device of claim 2, wherein: the first patterns adhere to the display panel, and the second patterns do not adhere to the display panel.

5. The curved display device of claim 2, wherein when the display panel is bent toward a first direction, the second patterns are arranged to bend so that parts thereof orient toward a second direction substantially perpendicular to the first direction.

6. The curved display device of claim 5, wherein when the display panel is bent toward a direction opposite to the first direction, the second patterns are arranged to straighten so as to extend substantially linearly between adjacent first patterns.

7. A curved display device, comprising: a display panel including a substrate; and a protection pattern patterned on the substrate, wherein the protection pattern includes a plurality of first patterns and second patterns connecting adjacent first patterns, the first patterns have shapes comprising a circle, a quadrangle, or a rhombus, and the second patterns have arcuate shapes extending between adjacent first patterns.

8. The curved display device of claim 7, wherein each second pattern has a shape that includes multiple arc shapes extending between adjacent first patterns.

9. The curved display device of claim 8, wherein the arc shapes of each second pattern are connected to each other.

10. The curved display device of claim 8, wherein when the display panel is bent toward a first direction, the second patterns are arranged to bend so that parts thereof orient toward a second direction substantially perpendicular to the first direction, and when the display panel is bent toward a direction opposite to the first direction, the second patterns are arranged to straighten so as to extend substantially linearly between adjacent first patterns.

11. The curved display device of claim 7, wherein a thickness of the protection pattern is about 80-90% of a total thickness of the substrate.

12. A curved display device, comprising: a protection pattern; a first polarizer formed on the protection pattern; a substrate formed on the first polarizer; a pixel electrode formed on the substrate; a liquid crystal layer positioned within a microcavity formed on the pixel electrode; a roof layer supporting the microcavity; and a first polarizer formed on the roof layer, wherein the protection pattern includes a plurality of first patterns and second patterns connecting adjacent first patterns, the first patterns have shapes comprising a circle, a quadrangle, or a rhombus, and the second patterns have arcuate shapes extending between adjacent first patterns.

13. The curved display device of claim 12, wherein each second pattern has a shape that includes multiple arc shapes extending between adjacent first patterns.

14. The curved display device of claim 13, wherein the arc shapes of each second pattern are connected to each other.

15. The curved display device of claim 13, wherein: the first patterns adhere to the display panel, and the second patterns do not adhere to the display panel.

16. The curved display device of claim 13, wherein when the display panel is bent toward a first direction, the second patterns are arranged to bend so that parts thereof orient toward a second direction substantially perpendicular to the first direction.

17. The curved display device of claim 16, wherein when the display panel is bent toward a direction opposite to the first direction, the second patterns are arranged to straighten so as to extend substantially linearly between adjacent first patterns.

18. A curved display device, comprising: a first polarizer; a substrate formed on the first polarizer and including a protection pattern formed thereunder; a pixel electrode formed on the substrate; a liquid crystal layer positioned within a microcavity formed on the pixel electrode; a roof layer supporting the roof layer; and a first polarizer formed on the roof layer, wherein the protection pattern includes a plurality of first patterns and second patterns connecting adjacent first patterns, each first pattern has a shape comprising a circle, a quadrangle, or a rhombus, and each second pattern has an arcuate shape extending between adjacent first patterns.

19. The curved display device of claim 18, wherein when the display panel is bent toward a first direction, the second patterns are arranged to bend so that parts thereof orient toward a second direction substantially perpendicular to the first direction, when the display panel is bent toward a direction opposite to the first direction, the second patterns are arranged to straighten so as to extend substantially linearly between adjacent first patterns, and a thickness of the protection pattern is about 80-90% of a total thickness of the substrate.

* * * * *